United States Patent
Ito

(10) Patent No.: US 8,013,925 B2
(45) Date of Patent: Sep. 6, 2011

(54) IMAGING DEVICE, DISPLAY CONTROL DEVICE, DISPLAY DEVICE, AND IMAGE DISPLAY SYSTEM FOR IMPROVED THUMBNAIL IMAGE DISPLAY

(75) Inventor: Daisuke Ito, Osaka (JP)

(73) Assignee: Panasonic Corporation, Osaka (JP)

( * ) Notice: Subject to any disclaimer, the term of this patent is extended or adjusted under 35 U.S.C. 154(b) by 479 days.

(21) Appl. No.: 12/091,545

(22) PCT Filed: Nov. 7, 2006

(86) PCT No.: PCT/JP2006/322152
§ 371 (c)(1),
(2), (4) Date: Apr. 25, 2008

(87) PCT Pub. No.: WO2007/063680
PCT Pub. Date: Jun. 7, 2007

(65) Prior Publication Data
US 2009/0251564 A1    Oct. 8, 2009

(30) Foreign Application Priority Data

Dec. 1, 2005 (JP) .................................. 2005-348228

(51) Int. Cl.
*H04N 5/222* (2006.01)
(52) U.S. Cl. .................................................. 348/333.05
(58) Field of Classification Search ............... 348/231.1, 348/333.05, 333.11
See application file for complete search history.

(56) References Cited

U.S. PATENT DOCUMENTS

| | | | | |
|---|---|---|---|---|
| 5,576,759 A | * | 11/1996 | Kawamura et al. | 348/207.99 |
| 5,602,675 A | * | 2/1997 | Okada | 359/554 |
| 5,973,734 A | * | 10/1999 | Anderson | 348/239 |
| 6,172,709 B1 | * | 1/2001 | Yamano et al. | 348/360 |
| 6,262,769 B1 | * | 7/2001 | Anderson et al. | 348/333.1 |
| 6,453,078 B2 | * | 9/2002 | Bubie et al. | 382/305 |
| 6,924,837 B2 | * | 8/2005 | Wakui | 348/208.99 |
| 7,286,178 B2 | * | 10/2007 | Isoyama | 348/333.02 |

(Continued)

FOREIGN PATENT DOCUMENTS

JP    2001-045354    2/2001

(Continued)

*Primary Examiner* — Jason Chan
*Assistant Examiner* — Gary C Vieaux
(74) *Attorney, Agent, or Firm* — McDermott Will & Emery LLP

(57) ABSTRACT

An imaging device which is capable of realizing an easily viewable thumbnail display is provided. The imaging device includes: an imaging optical system for forming an optical image of an object; an imaging sensor for receiving the optical image of the object formed by the imaging optical system, for converting the received optical image into an electrical image signal, and for outputting the electrical image signal; an attitude detection section for detecting an attitude of the imaging device at the time of shooting; an image recording section for interrelating and recording the outputted image signal and attitude information indicative of the detected attitude; a display section for displaying a reduced image based on the recorded image signal; a reception section for receiving a selection of the attitude information from a user; and an image display control section for changing a location and a display size of the reduced image on the display section in accordance with the selected attitude information. The image display control section restores an orientation of the reduced image so as to correspond to the attitude of the imaging device at the time of the shooting in accordance with the attitude information, and causes the display section to display the restored reduced image.

7 Claims, 13 Drawing Sheets

U.S. PATENT DOCUMENTS

| | | | |
|---|---|---|---|
| 7,289,132 B1* | 10/2007 | Reid et al. | 345/660 |
| 7,574,126 B2* | 8/2009 | Honjo et al. | 396/97 |
| 2001/0010544 A1* | 8/2001 | Wakui | 348/208 |
| 2002/0028071 A1* | 3/2002 | Molgaard | 396/53 |
| 2003/0063200 A1* | 4/2003 | Isoyama | 348/239 |
| 2005/0259173 A1 | 11/2005 | Nakajima et al. | |
| 2006/0098186 A1* | 5/2006 | Yumiki | 356/3.07 |
| 2009/0027510 A1* | 1/2009 | Yumiki | 348/222.1 |

FOREIGN PATENT DOCUMENTS

| | | |
|---|---|---|
| JP | 2002-262155 | 9/2002 |
| JP | 2004-221828 | 8/2004 |
| JP | 2005-094114 | 4/2005 |
| JP | 2005-277510 | 10/2005 |
| JP | 2006-262071 | 9/2006 |
| WO | WO 2005057265 A1 * | 6/2005 |

* cited by examiner

| CAMERA ATTITUDE | ATTITUDE DETERMINATION SIGNAL |
|---|---|
| 0° (HORIZONTAL SHOOTING) | 0 |
| 90° (VERTICAL SHOOTING) | 1 |

Prior Art
FIG. 14A
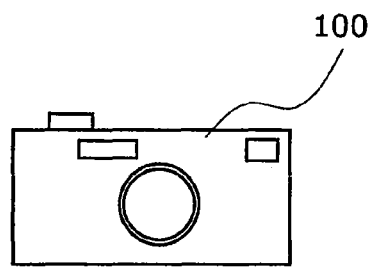
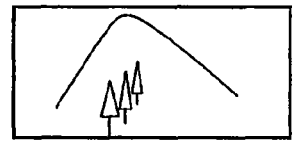
Prior Art
FIG. 14B
Prior Art
FIG. 14C
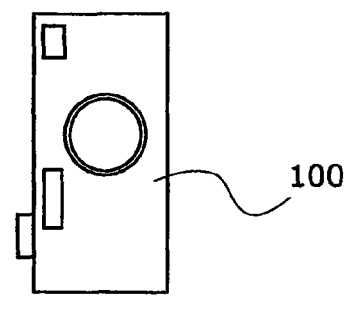
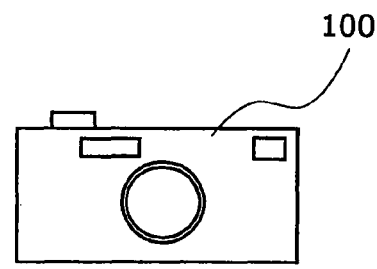
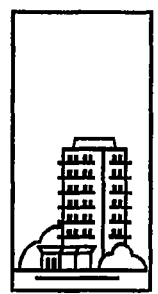

IMAGING DEVICE, DISPLAY CONTROL DEVICE, DISPLAY DEVICE, AND IMAGE DISPLAY SYSTEM FOR IMPROVED THUMBNAIL IMAGE DISPLAY

RELATED APPLICATIONS

This application is the U.S. National Phase under 35 U.S.C. §371 of International Application No. PCT/JP2006/322152, filed on Nov. 7, 2006, which in turn claims the benefit of Japanese Patent Application No. JP 2005-348228, filed on Dec. 1, 2005, the disclosures of which Applications are incorporated by reference herein.

TECHNICAL FIELD

The present invention relates to a display method of an image obtained by an imaging device, and more specifically relates to an imaging device, a display control device, a display device, an image display system and an imaging system which control a display method of an obtained image in accordance with information about an attitude of the imaging device.

BACKGROUND ART

In recent years, an imaging sensor, such as a CCD (Charge Coupled Device) and a CMOS (Complementary Metal-Oxide Semiconductor), and a signal processing circuit are increasingly improved in terms of integration density and come to be available inexpensively. Accordingly, a digital still camera and a digital video camera (hereinafter simply referred to as a "digital camera"), which are capable of converting an optical image of an object into an electrical image signal and outputting the same, are rapidly growing popular.

FIGS. 14A to 14C are diagrams each showing a relation between an attitude of the digital camera and an attitude of a picked up image displayed on a display section thereof. As shown in each of FIGS. 14A to 14C, a photographer performs shooting by changing the attitude of a digital camera 100 in accordance with a shooting intention. For example, in the case of shooting a horizontally oriented object such as a landscape, the photographer turns the attitude of the digital camera 100 so as to be in a horizontally oriented state and then performs shooting. On the other hand, in the case of shooting a vertically oriented object such as a person and a building, the photographer turns the attitude of the digital camera 100 so as to be in a vertically oriented state and then performs shooting. Hereinafter, as shown in FIG. 14A, the attitude of the digital camera 100 when a stroke direction of a shutter button thereof is in parallel with the gravity direction is referred to as a horizontal shooting attitude. On the other hand, as shown in FIG. 14B, the attitude of the digital camera 100 when the stroke direction of the shutter button is perpendicular to the gravity direction is referred to as a vertical shooting attitude. Further, images shot in the respective attitudes are referred to as a horizontally shot image and a vertically shot image, respectively. In the conventional digital camera 100, a shot image is displayed in the same direction as the attitude of the digital camera 100 at the time of shooting. That is, in the case where an image shot in the vertical shooting attitude, as shown in FIG. 14B, is displayed on the display section while the digital camera 100 is situated in the horizontal attitude, as shown in FIG. 14C, an orientation of the shot image displayed thereon is different from an orientation of the image at the time of the shooting. Therefore, in the case of displaying a series of shot images in which vertically shot image and horizontally shot image are mixed together, a problem of difficulty in viewing is caused since the orientation of the vertically shot image is different from the orientation at the time of the shooting.

Against this problem, Japanese Laid-Open Patent Publication No. 2001-45354 (hereinafter referred to as Patent document 1) discloses a technique of providing an imaging device having rotation state detection means for detecting a rotation state of photoelectric conversion means and adding means for adding rotation state information at the time of the shooting to an image signal obtained based on an output from the photoelectric conversion means.

By adding the rotation state information to the obtained image signal, the attitude of the digital camera at the time of the shooting is detected, whereby a display in accordance with the attitude at the time of the shooting can be performed regardless of whether the image is shot in the horizontal shooting attitude or in the vertical shooting attitude.

Patent document 1: Japanese Laid-Open Patent Publication No. 2001-45354

DISCLOSURE OF THE INVENTION

Problems to be Solved by the Invention

In order for a photographer to display a plurality of shot images, there is a method for displaying a list of the shot images on a display section 200 provided in a digital camera. FIG. 15 is a diagram showing an example of a list of shot images displayed by the imaging device described in Patent document 1. In order to display the list, each of the images is reduced and displayed. Hereinafter, to display a list of a plurality of images on the display section is referred to as a thumbnail display, and images which are reduced so as to be displayed as the list are each referred to as a thumbnail image. Further, a thumbnail image of an image which is shot in a horizontal shooting attitude is referred to as a horizontal thumbnail image, and a thumbnail image of an image which is shot in a vertical shooting attitude is referred to as a vertical thumbnail image.

As shown in FIG. 15, according to an invention described in Patent document 1, when the shot images are displayed in a thumbnail form, a display can be performed in accordance with an attitude at the time of shooting, regardless of the horizontally shot image or the vertically shot image. However, a display size of the vertical thumbnail image displayed on the display section 200 is adjusted such that a length of a long side thereof becomes equal to a length of a short side of the horizontal thumbnail image. That is, the vertical thumbnail image is displayed narrowly in the horizontal direction compared with the horizontal thumbnail image, and cannot be displayed in an enlarged manner. Therefore, the vertical thumbnail image displayed on the display section 200 is displayed in a smaller size compared with a size of the horizontal thumbnail image, which causes a problem in that the photographer has difficulty in viewing, and also causes a problem of poor viewability.

Therefore, an object of the present invention is to provide an imaging device, a display control device, a display device, an image display system, and an imaging system which are capable of realizing an easily viewable and convenient thumbnail display.

Solution to the Problems

An object of the present invention is attained by an imaging device having the following configurations. The imaging device for outputting an optical image of an object as an electrical image signal comprises: an imaging optical system for forming the optical image of the object; an imaging sensor for receiving the optical image of the object formed by the imaging optical system, for converting the optical image into the electrical image signal, and for outputting the electrical image signal; an attitude detection section for detecting an attitude of the imaging device at the time of shooting; an image recording section for interrelating and recording the outputted image signal and attitude information indicative of the detected attitude; a display section for displaying a reduced image based on the recorded image signal; a reception section for receiving a selection of the attitude information from a user; and an image display control section for changing a location and a display size of the reduced image on the display section in accordance with the selected attitude information. The image display control section restores an orientation of the reduced image so as to correspond to the attitude of the imaging device at the time of the shooting in accordance with the attitude information and causes the display section to display the restored reduced image.

According to the configuration, thumbnail images are each restored such that an orientation thereof corresponds to a shooting attitude thereof at the time of the shooting, and then displayed on the display section. Furthers since the imaging device changes the location and the display size of each of the thumbnail images in accordance with the attitude information selected by the user, it is possible to perform a thumbnail display which can be viewed easily by the user.

The present invention is attained by an imaging device having the following configuration. The imaging device which outputs an optical image of an object as an electrical image signal and which is connectable to a display device comprises: an imaging optical system for forming the optical image of the object; an imaging sensor for receiving the optical image of the object formed by the imaging optical system, for converting the optical image into the electrical image signal, and for outputting the electrical image signal; an attitude detection section for detecting an attitude of the imaging device at the time of shooting; an image recording section for interrelating and recording the outputted image signal and attitude information indicative of the detected attitude; a reception section for receiving a selection of the attitude information from a user; and a display control signal output section for generating, in accordance with the selected attitude information, a display control signal for changing a location and a display size of a reduced image on the display device, the reduced image being based on the image signal. The image display control signal includes a signal for storing an orientation of the reduced image so as to correspond to the attitude of the imaging device at the time of the shooting in accordance with the attitude information and for causing the display section to display the restored reduced image.

The object of the present invention is attained by a display control device having the following configuration. The display control device connectable to a display device comprises:

a reading section for reading an image signal and attitude information corresponding to the image signal, the image signal and the attitude information being recorded in a recording section; a reception section for receiving a selection of the attitude information from a user; and a display control signal output section for outputting, in accordance with the selected attitude information, a display control signal for changing a location and a display size of a reduced image on the display device, the reduced image being based on the image signal. The image display control signal includes a signal which restores an orientation of the reduced image so as to correspond to the attitude of the imaging device at the time of the shooting in accordance with the attitude information and which causes the restored reduced image to be displayed on the display section.

The present invention is attained by a display control device having the following configuration. The display control device connectable to a display device comprises: a reading section for reading an image signal and attitude information corresponding to the image signal, the image signal and the attitude information being recorded in a recording section; a reception section for receiving a selection of the attitude information from a user; and a display control signal output section for outputting, in accordance with the selected attitude information, a display control signal for changing a location and a display size of a reduced image on the display device, the reduced image being based on the image signal. The image display control signal includes a signal which restores an orientation of the reduced image so as to correspond to the attitude of the imaging device at the time of the shooting in accordance with the attitude information and which causes the restored reduced image to be displayed on the display section.

The object of the present invention is attained by an image display system having the following configuration. The image display system includes an imaging device for outputting an optical image of an object as an electrical image signal, and a display device for displaying a shot image. The imaging device comprises: an imaging optical system for forming the optical image of the object; an imaging sensor for receiving the optical image formed by the imaging optical system, for converting the optical image into the electrical image signal, and for outputting the electrical image signal; an attitude detection section for detecting an attitude of the imaging device at the time of shooting; an image recording section for interrelating and recording the outputted image signal and attitude information indicative of the detected attitude; a reception section for receiving a selection of the attitude information from a user; and a display control signal output section for outputting, in accordance with the selected attitude information, a display control signal for changing a location and a display size of a reduced image on the display device, the reduced image being based on the image signal. The display control signal includes a signal for storing an orientation of the reduced image so as to correspond to the attitude of the imaging device at the time of the shooting in accordance with the attitude information and for causing the display section to display the restored reduced image. The display device comprises: a reception section for receiving the recorded image signal and the outputted display control signal; and a display section for displaying the reduced image in accordance with the display control signal, the reduced image being based on the image signal.

The object of the present invention is attained by an imaging system having the following configuration. The imaging system includes a lens barrel and an imaging device which is detachably fixed to the lens barrel. The lens barrel comprises an imaging optical system for forming an optical image of an object. The imaging device comprises: an imaging sensor for receiving the optical image of the object formed by the imaging optical system connected thereto, for converting the optical image into the electrical image signal, and for outputting the electrical image signal; an attitude detection section for detecting an attitude of the imaging device at the time of shooting; an image recording section for interrelating and recording the outputted image signal and attitude information indicative of the detected attitude; a display section for displaying a reduced image based on the recorded image signal; a reception section for receiving a selection of the attitude information from a user; and an image display control section for changing a location and a display size of the reduced image on the display section in accordance with the selected attitude information. The image display control section restores an orientation of the reduced image so as to correspond to the attitude of the imaging device at the time of the shooting in accordance with the attitude information and causes the restored reduced image to be displayed in the display size.

The object of the present invention is attained by an imaging system having the following configuration. The imaging system includes a lens barrel and an imaging device which is detachably fixed to the lens barrel. The lens barrel comprises: an imaging optical system for forming an optical image of an object; and an attitude detection section for detecting an attitude of the imaging device at the time of shooting. The imaging device comprises an imaging sensor for receiving the optical image of the object formed by the imaging optical system connected thereto, for converting the optical image into the electrical image signal, and for outputting the electrical image signal; the attitude detection section for detecting the attitude of the imaging device at the time of the shooting; an image recording section for interrelating and recording a reduced image based on the outputted image signal and attitude information indicative of the detected attitude; a display section for displaying the recorded reduced image; a reception section for receiving a selection of the attitude information from a user; and an image display control section for changing a location and a display size of the reduced image on the display section in accordance with the selected attitude information. The image display control section restores an orientation of the reduced image so as to correspond to the attitude of the imaging device at the time of the shooting in accordance with the attitude information and causes the restored reduced image to be displayed in the display size.

EFFECT OF THE INVENTION

As above described, according to the present invention, it is possible to provide the imaging device, the display control device, the display device, the image display system, and the imaging system which are capable of realizing the easily viewable and convenient thumbnail display even when thumbnail images of images which have been shot in various shooting attitudes are displayed in a mixed manner.

BRIEF DESCRIPTION OF THE DRAWINGS

FIG. 14A is a diagram showing a relation between an attitude of the digital camera and an orientation of a shot image displayed on the display section.

FIG. 14B is a diagram showing the relation between the attitude of the digital camera and the orientation of the shot image displayed on the display section.

FIG. 14C is a diagram showing the relation between the attitude of the digital camera and the orientation of the shot image displayed on the display section.

Figure 1:
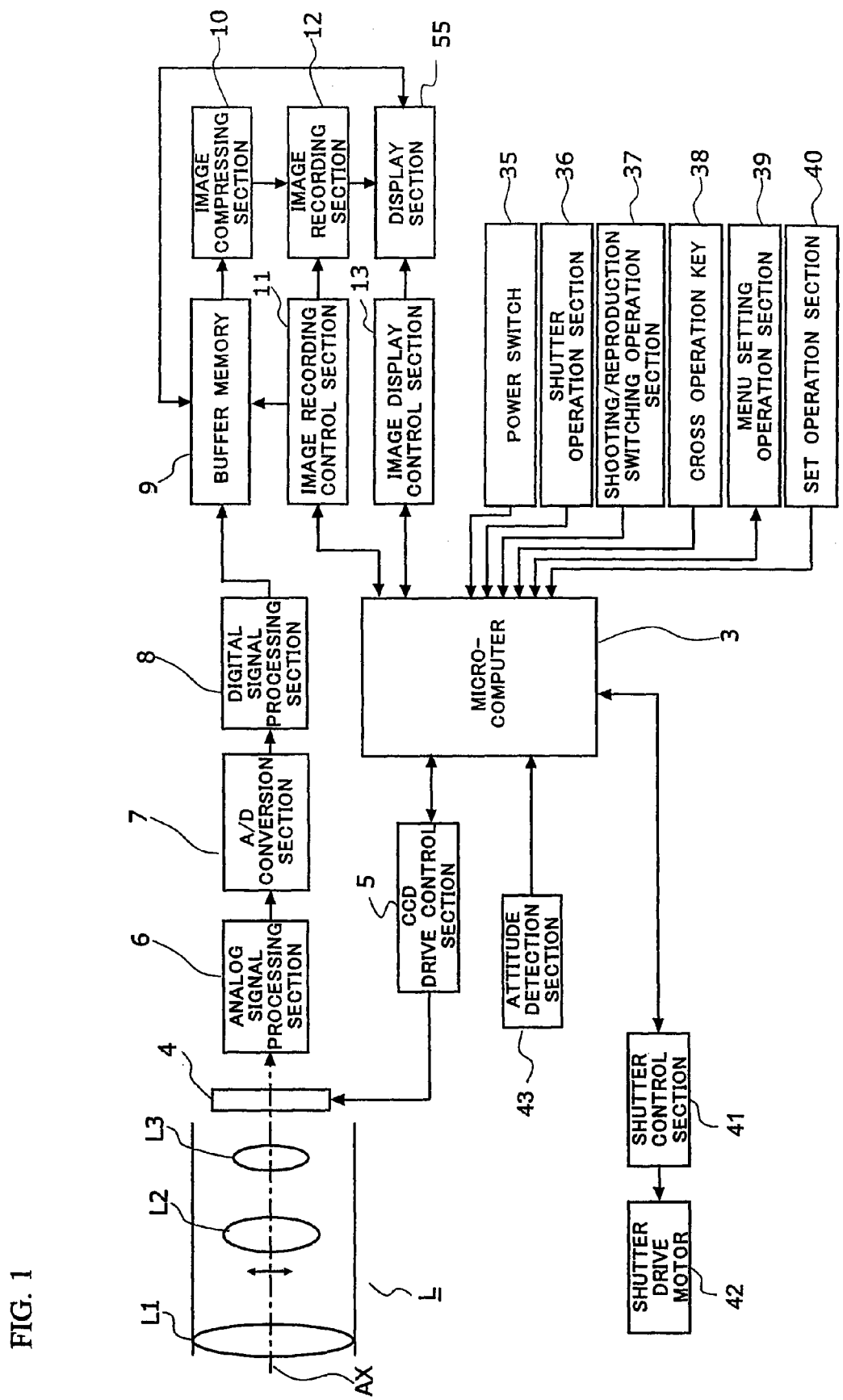
FIG. 1 is a block diagram showing a general configuration of a digital camera according to embodiment 1.

DESCRIPTION OF THE REFERENCE CHARACTERS 1 digital camera
1a housing
2 lens
3 microcomputer
4 imaging sensor
5 CCD drive control section
6 analog signal processing section
7 A/D conversion section
8 digital signal processing section
9 buffer memory
10 image compressing section
11 image recording control section
12 image recording section
13 image display control section
14 display layout storage section
35 power switch
36 shutter operation section
37 shooting/reproduction switching operation section
38 cross operation key
39 MENU setting operation section
40 SET operation section
55 display section
60 attitude determination signal 65 display image priority selection menu
66a horizontally shot image selection button
66b vertically shot image selection button
70 display device
75 cable
80 display device
81 removable memory insertion section
82 display control device
90 shot image folder
91 still image folder
92 moving image folder
93a, 93b horizontal image folder
94a, 94b vertical image folder
95 still image file
96 moving image file
L imaging optical system
L1 first lens unit
L2 second lens unit
L3 third lens unit
H horizontal thumbnail image
V vertical thumbnail image

BEST MODE FOR CARRYING OUT THE INVENTION

Embodiment 1

FIG. 1 is a block diagram showing a general configuration of a digital camera 1 according to embodiment 1. As shown in FIG. 1, the digital camera 1 includes an imaging optical system L, a microcomputer 3, an imaging sensor 4, a CCD drive control section 5, an analog signal processing section 6, an A/D conversion section 7, a digital signal processing section 8, a buffer memory 9, an image compressing section 10, an image recording control section 11, an image recording section 12, an image display control section 13, a display section 55, a shutter control section 41, and a shutter drive motor 42.

The imaging optical system L is an optical system including three lens units L1, L2 and L3. The first lens unit L1 moves in an optical axis direction, whereby zooming is performed. The third lens unit L3 moves in the optical axis direction, whereby focusing is performed. The second lens unit L2 is a compensation lens unit, and plays a role of compensating a motion of an image by moving on a plane perpendicular to the optical axis and by decentering the optical axis.

The microcomputer 3 controls the whole of various control sections provided in the digital camera 1. The microcomputer 3 is capable of receiving respective signals from a power switch 35, a shutter operation section 36, a shooting/reproduction switching operation section 37, a cross operation key 38, a MENU setting operation section 39 and a SET operation section 40.

The shutter operation section 36 is, for example, typified by a release button, and is operated by a user at the time of shooting. When the shutter operation section 36 is operated, a timing signal is outputted to the microcomputer 3. In accordance with a control signal which is outputted from the microcomputer 3 upon reception of the timing signal, the shutter control section 41 drives the shutter drive motor 42 and then actuates the shutter.

The imaging sensor 4 is a CCD, and converts an optical image, which is formed by the imaging optical system L, into an electrical signal. The imaging sensor 4 is drive-controlled by the CCD drive control section 5. The imaging sensor 4 may be a CMOS.

An image signal outputted by the imaging sensor 4 is transmitted and processed through the analog signal processing section 6, the A/D conversion section 7, the digital signal processing section 8, the buffer memory 9 and the image compressing section 10, in sequence. In the analog signal processing section 6, the image signal outputted by the imaging sensor 4 is subject to analog signal processing such as gamma processing. The A/D conversion section 7 converts an analog signal outputted by the analog signal processing section 6 into a digital signal. In the digital signal processing section 8, the image signal, which is the digital signal converted by the A/D conversion section 7, is subject to digital signal processing such as noise reduction and edge enhancement. The buffer memory 9 is a RAM (Random Access Memory), and temporarily stores the image signal processed by the digital signal processing section 8.

The image signal stored in the buffer memory 9 is transmitted and processed through the image compressing section 10 to the image recording section 12, in sequence. The image signal stored in the buffer memory 9 is read in accordance with a command issued by the image recording control section 11, and transmitted to the image compressing section 10. Data of the image signal transmitted to the image compressing section 10 is compressed at a predetermined rate, and thus a data size thereof is reduced. As the compressing method, a JPEG (Joint Photographic Experts Group) method may be adopted, for example. At the same time, the image compressing section 10 also creates a reduced image signal which corresponds to a shot image and is used for a thumbnail display or the like. Thereafter, the compressed image signal and the reduced image signal are transmitted to the image recording section 12.

The image recording section 12 interrelates and records the image signal, the corresponding reduced image signal and predetermined information to be recorded in accordance with a command issued by the image recording control section 11, and is typified by an internal memory and/or a removable memory, for example. The predetermined information to be recorded together with the image signal includes a date when an image was shot, focal length information, shutter speed information, aperture value information, shooting mode information and information about an attitude of the digital camera 1 which is described later.

The image display control section 13 is controlled by the control signal from the microcomputer 3. In accordance with a command from the image display control section 13, the display section 55 causes the image signal recorded in the image recording section 12 or in the buffer memory 9 to be displayed as a visible image. As display modes, the display section 55 has a mode to display only an image signal as the visible image and a mode to display an image signal and information at the time of shooting as the visible image. The information at the time of the shooting of the image signal includes the focal length information, the shutter speed information, the aperture value information, the shooting mode information, focusing state information, and the attitude information. These pieces of information are displayed by operating the MENU setting operation section 39.

Figure 2A:
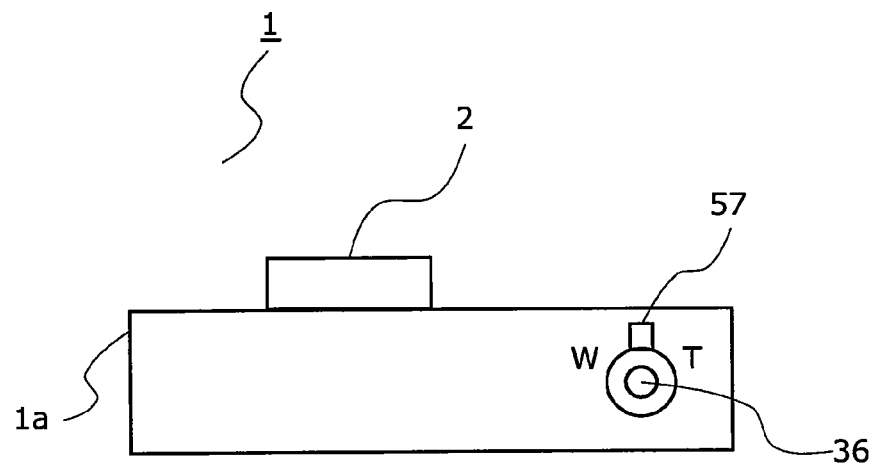
FIG. 2A is a top view showing a configuration of the digital camera according to embodiment 1.
Figure 2B:
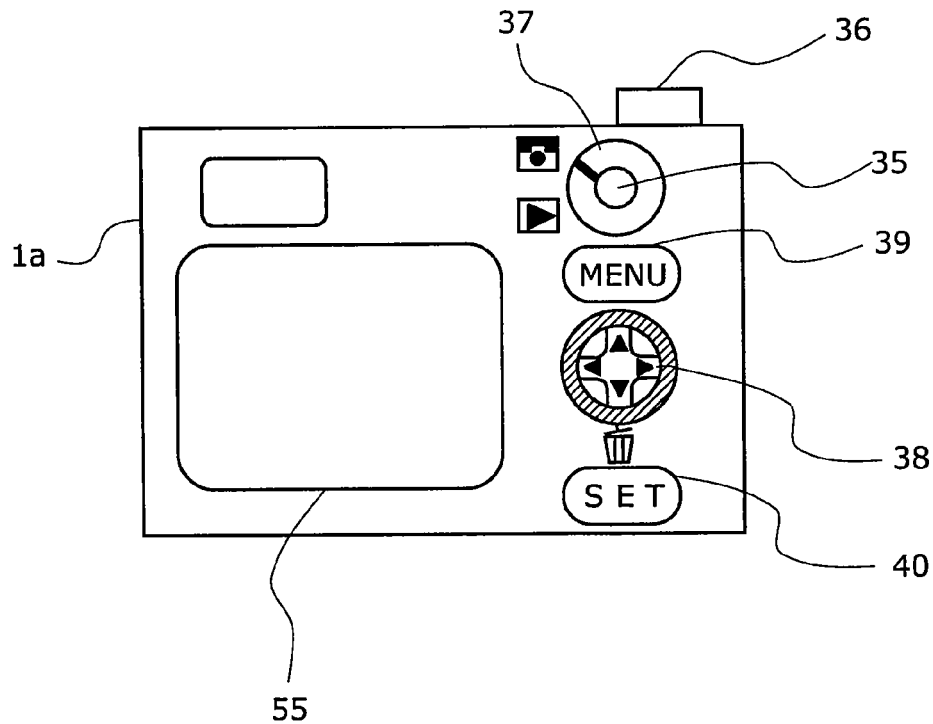
FIG. 2B is a back view showing a configuration of the digital camera according to embodiment 1.

Next, a configuration of the digital camera 1 according to embodiment 1 will be described, with reference to FIGS. 2A and 2B. FIG. 2A is a top view of the digital camera 1, and FIG. 2B is a back view of the digital camera 1.

A housing 1a has situated on a front surface thereof the imaging optical system including a lens 2, and also has situated on a back surface thereof the power switch 35, the shooting/reproduction switching operation section 37, the cross operation key 38, the MENU setting operation section 39, the SET operation section 40, and the display section 55 which is constituted of an LCD monitor. Further, the housing 1a has situated on a top surface thereof the shutter operation section 36 and a zoom operation section 57.

The zoom operation section 57 is located in the vicinity of the shutter operation section 36 so as to rotate coaxially with the shutter operation section 36. The power switch 35 is an operation member for turning the power of the digital camera 1 ON/OFF. The shooting/reproduction switching operation section 37 is an operation member for switching between a shooting mode and a reproducing mode, and every time a lever thereof is rotated, switching is performed. When the zoom operation section 57 is rotated to the right while the shooting mode is selected, the imaging optical system L is switched to be telephoto. On the other hand, the zoom operation section 57 is rotated to the left, the imaging optical system L is switched to be wide-angle.

The MENU setting operation section 39 is an operation member for causing various menus to be displayed on the display section 55. The cross operation key 38 is an operation member for selecting any one of the various operation menus, which are displayed on the display section 55 in accordance with the operation of the MENU setting operation section 39, by pressing any one of upper, lower, left and right portions of the cross operation key 38. When any one of the various operation menus is selected in accordance with the operation of the cross operation key 38, the microcomputer 3 issues a command for executing an operation of the selected menu. The SET operation section 40 is an operation member for returning the display of the various operation menus to a state prior to such display.

Next, an attitude detection section 43 for detecting the attitude of the digital camera 1 according to the present embodiment will be described. Presently, various types of attitude detection methods are available for detecting the attitude of the digital camera 1. As an example, a digital camera including a rotation detection section has been proposed as disclosed in Patent document 1. Alternatively, there has been proposed a digital camera including an image blurring compensation section which detects vibration applied to the digital camera and which drives the compensation lens of the imaging optical system so as to move in two directions respectively perpendicular to the optical axis. The digital camera including the image blurring compensation section detects a drive signal outputted to the compensation lens from the image blurring compensation section, and then determines the attitude of the digital camera. The digital camera 1 according to the present embodiment may include the attitude detection section for detecting the attitude in accordance with the above-described method. Alternatively, without limiting to this, an angular velocity sensor or the like may be fixed to the digital camera. The above-described attitude detection methods are merely examples, and without limiting to these methods, any configuration may be applicable as long as the configuration is capable of detecting the attitude.

Figures 3, 4:
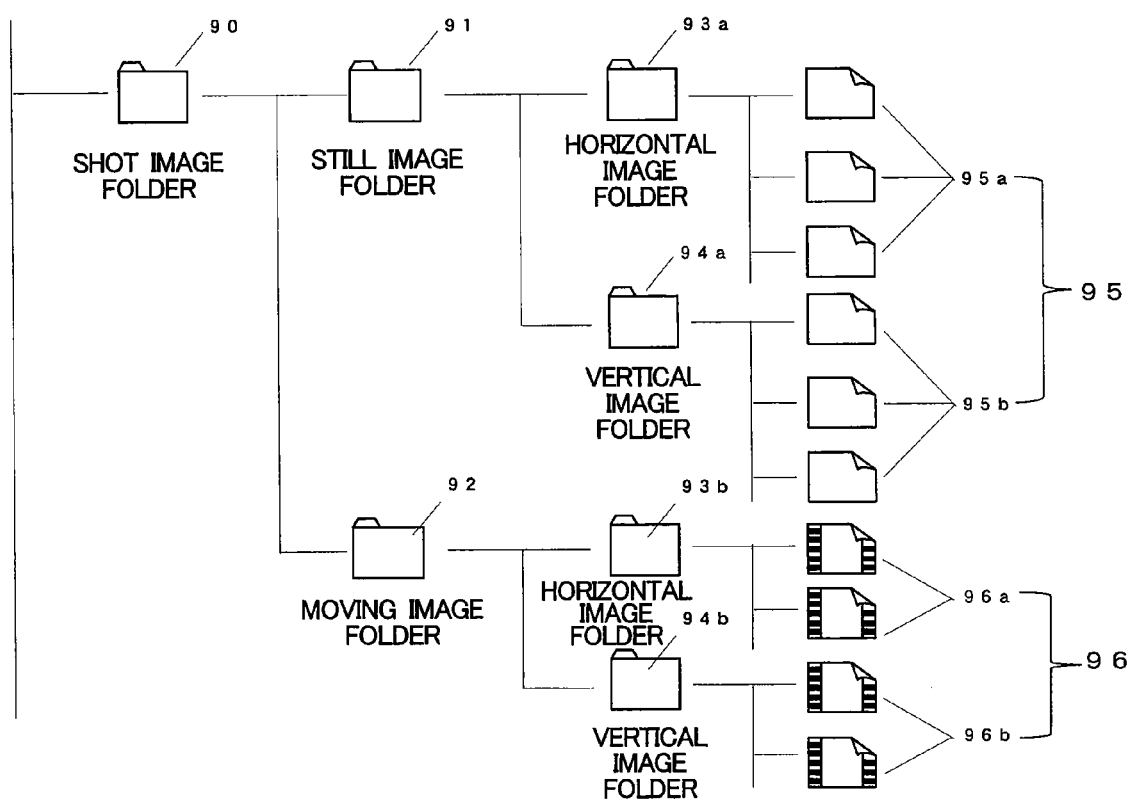
FIG. 3 is a diagram showing attitude determination signals outputted corresponding to respective shooting attitudes according to embodiment 1.
FIG. 4 is a diagram illustrating a managing method of shot image files according to embodiment 1.

An operation of the digital camera 1 according to the present embodiment will be described. FIG. 3 shows attitude determination signals which are to be outputted and which correspond to respective shooting attitudes. As the shooting attitude in the present embodiment, the horizontal shooting attitude is set as a reference attitude of the digital camera 1 (an angle thereof is 0°). Therefore, the vertical shooting attitude represents an attitude which is obtained by rotating the digital camera 1 about the optical axis by 90° from the reference attitude thereof.

In the case of shooting, the photographer turns the power switch 35 ON, and turns the shooting/reproduction switching operation section 37 to the shooting mode. Accordingly, the digital camera 1 is shifted to a shootable state. When the photographer turns the digital camera 1 to be in the horizontal shooting attitude in order to shoot a horizontally oriented object such as a landscape, the attitude detection section 43 outputs an attitude determination signal 60(0). When the shutter operation section 36 is operated while the digital camera 1 is in the horizontal shooting attitude, the image recording control section 11 adds the attitude determination signal 60(0) to an image file in which an image signal is to be stored. The attitude determination signal 60 is added to a header or a footer of the image file, for example. The image file, to which the attitude determination signal 60 has been added, is recorded in the image recording section 12.

On the other hand, when the photographer turns the digital camera 1 to be in the vertical shooting attitude in order to shoot a vertically oriented object such as a person, the attitude detection section 43 outputs an attitude determination signal 60(1) When the shutter operation section 36 is operated while the digital camera 1 is in the vertical shooting attitude, the image recording control section 11 adds the attitude determination signal 60(1) to the image file in which an image signal is to be stored. The attitude determination signal 60(1) is added to the header or the footer of the image file, for example. The image file, to which the attitude determination signal 60(1) has been added, is recorded in the image recording section 12. In this manner, the attitude determination signal 60 corresponding to the attitude of the digital camera 1 at the time of the shooting is stored in the image file together with the image signal.

Next, with reference to FIG. 4, a managing method of the image file having stored therein the image signal and the attitude determination signals will be described. As shown in FIG. 4, in the image recording section 12, a shot image folder 90 is created, and in a hierarchy thereunder, a still image folder 91 and a moving image folder 92 are created. In hierarchies under the still image folder 91 and the moving image folder 92, horizontal image folders 93a and 93b and vertical image folders 94a and 94b are created, respectively. Accordingly, shot images are sorted into folders for a still image and a moving image, respectively, and further sorted into and stored in folders which are classified by the shooting attitude at the time of shooting. For example, a still image, which is shot in a still image shooting mode while the digital camera is in the horizontal shooting attitude, is stored in the horizontal image folder 93a as the still image file 95. As another example, a moving image, which is shot in a moving image shooting mode while the digital camera is in the vertical shooting attitude, is stored in the vertical image folder 94b as the moving image file 96.

Figure 5:
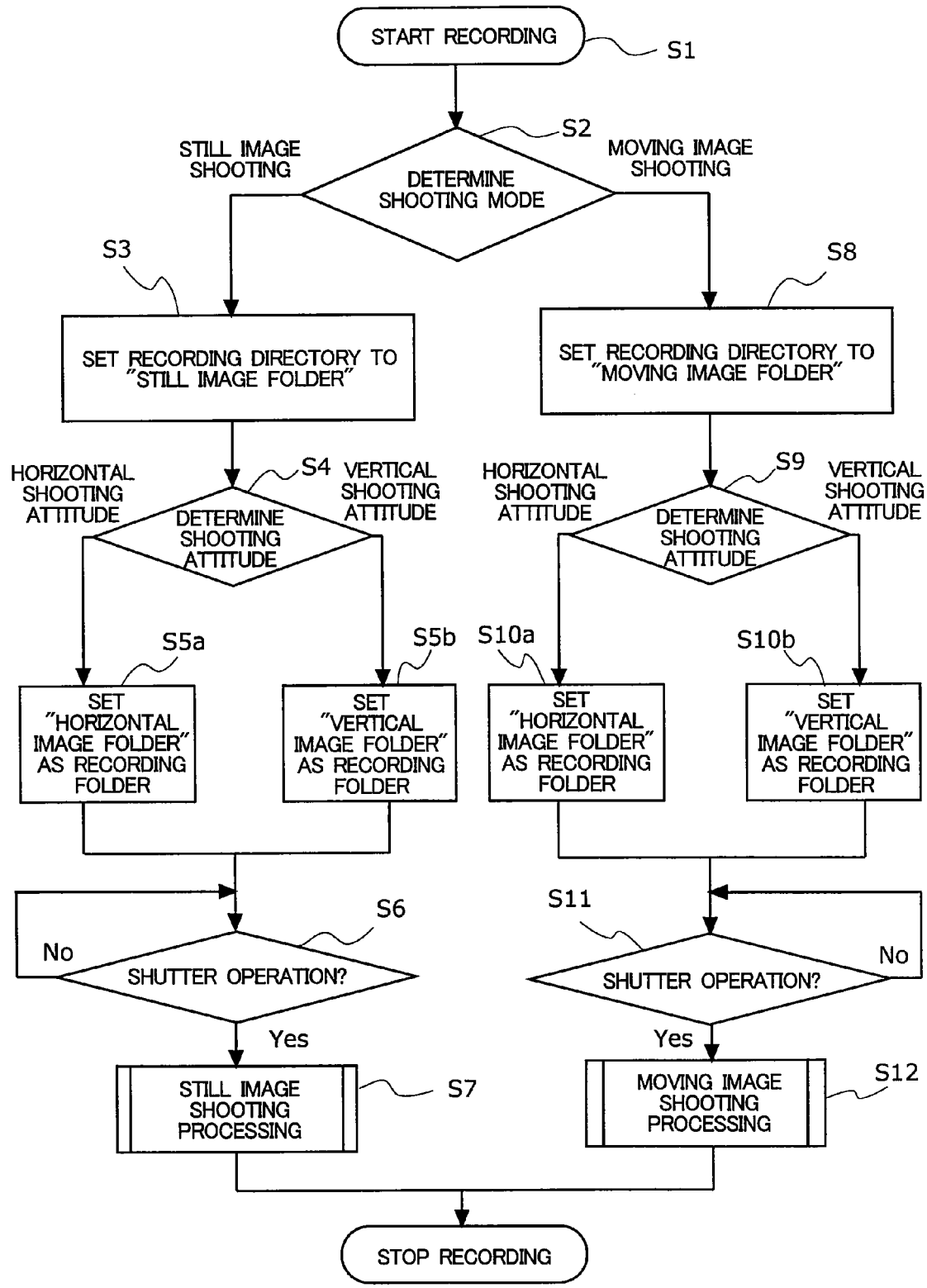
FIG. 5 is a flowchart from a start of recording to an end of recording of a shot image according to embodiment 1.

FIG. 5 is a flowchart showing recording processing of the shot image, from a start of the recording to an end of the recording. In order to record the shot image, the photographer operates the MENU setting operation section 39, and causes a screen containing various menus to be displayed on the display section 55. The photographer selects an image record from the displayed various menus of the screen. In accordance with a series of operations, the digital camera 1 is shifted to an image record mode (step S1). Next, the microcomputer 3 determines the shooting mode. In other words, the microcomputer 3 determines whether the photographer has selected the still image shooting mode or the moving image shooting mode (step S2). When the still image shooting mode is selected, the processing of the digital camera 1 proceeds to step S3, whereas when the moving image shooting mode is selected, the processing of the digital camera 1 proceeds to step S8.

Processing (steps S3 to S7) for a case where it is determined that the still image shooting mode is selected in step S2 will be described. The image recording control section 11 sets the still image folder 91 as a recording directory of the shot image (step S3). The image recording control section 11 then determines the attitude of the digital camera 1 in accordance with the attitude determination signal 60 outputted by the attitude detection section 43 (step S4). That is, in the case where the attitude determination signal 60 is (0), the attitude of the digital camera 1 is the horizontal shooting attitude, whereas in the case where the attitude determination signal is (1), the attitude of the digital camera 1 is the vertical shooting attitude.

When the shooting attitude of the digital camera 1 determined in step S4 is the horizontal shooting attitude, the image recording control section 11 sets the horizontal image folder 93a as a folder for storing there in the shot image (step S5a). On the other hand, when the shooting attitude thereof is the vertical shooting attitude, the image recording control section 11 sets the vertical image folder 94a as the folder for storing therein the shot image (step S5b). In this manner, through the processing in step S5a or S5b, the folder for recording the still image is determined. Next, whether or not the photographer has pressed the shutter operation section 36 is determined (step S6). When the photographer has pressed the shutter operation section 36 still image shooting processing is performed (step S7). When the still image shooting processing is completed, the shot image is stored in a predetermined folder, and the recording ends. The still image shot in this manner is stored as the image file 95a or 95b in the horizontal image folder 93a or the vertical image folder 94a.

Processing (steps S8 to S12) for a case where it is determined that the moving image shooting mode is selected in step S2 will be described. When the photographer has selected the moving image shooting mode, the image recording control section 11 sets the moving image folder 92 as the directory for recording the shot image (step S8). The image recording control section 11 determines the attitude of the digital camera 1 in accordance with the attitude determination signal 60 outputted by the attitude detection section 43 (step S9). Subsequently, when the shooting attitude of the digital camera 1 determined in step S9 is the horizontal shooting attitude, the image recording control section 11 sets the horizontal image folder 93b as the folder for storing therein the shot image (step S10a). On the other hand, when the shooting attitude is the vertical shooting attitude, the image recording control section 11 sets the vertical image folder 94b as the folder for storing therein the shot image (step S10b). Whether or not the photographer has pressed the shutter operation section 36 is then determined (step S1). When the photographer has pressed the shutter operation section 36, the moving image shooting processing is performed (step S12). When the moving image shooting processing is completed, the shot image is stored in a predetermined folder, and recording ends. The moving image shot in this manner is recorded as the image file 96a or 96b in the horizontal image folder 93b or the vertical image folder 94b. Here ends the recording processing of the shot image as shown in FIG. 5.

Figure 6A:
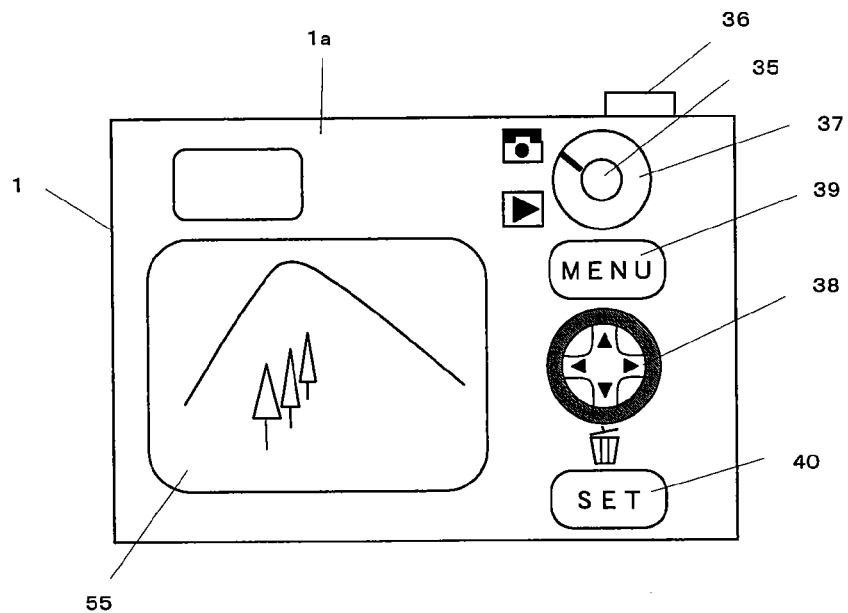
FIG. 6A shows an example of shot image displayed on the display section of the digital camera according to embodiment 1, and represents an exemplary display of a horizontally shot image.
Figure 6B:
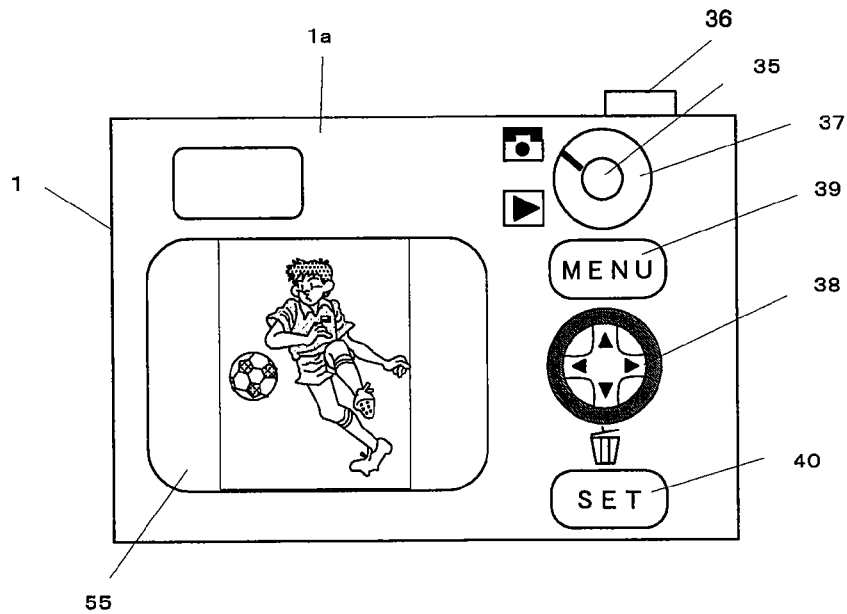
FIG. 6B is a diagram showing an example of shot image displayed on the display section of the digital camera according to embodiment 1, and represents an exemplary display of a vertically shot image.

Next, display processing of an image shot by the digital camera 1 will be described with reference FIGS. 6A and 6B. FIGS. 6A and 6B show examples of shot image displayed on the display section 55 of the digital camera 1. FIG. 6A shows an exemplary display of a horizontally shot image, and FIG. 6B shows an exemplary display of a vertically shot image. In order to display the shot image on the display section 55, the photographer turns the power switch 35 ON, and turns the shooting/reproduction switching operation section 37 to the reproduction mode. Accordingly, on the display section 55, one shot image is displayed, or shot images are displayed in a thumbnail form. In the case of the thumbnail display, the photographer can select an image from among the displayed thumbnail images by operating the cross operation key 38. In accordance with the above-described series of operations, the selected shot image is displayed on the display section 55. In this case, the image display control section 13 controls the display of the shot image in accordance with the attitude determination signal 60 outputted by the attitude detection section 43 at the time of shooting. Hereinafter, display control processing of the shot image will be described.

To an image shot in the horizontal shooting attitude, the attitude determination signal 60(0) indicating that the digital camera 1 was in the horizontal shooting attitude at the time of the shooting, is given. When the added attitude determination signal is (0), the image display control section 13 causes the horizontally shot image to be displayed on the display section 55, as shown in FIG. 6A.

On the other hand, to an image shot in the vertical shooting attitude, the attitude determination signal 60(1) indicating that the digital camera 1 was in the vertical shooting attitude at the time of the shooting, is given. When the added attitude determination signal is (1), the image display control section 13 causes the shot image to be displayed on the display section 55 by rotating an orientation thereof by 90°, as shown in FIG. 6B. That is, the shot image displayed on the display section 55 is restored such that the attitude thereof is identical to that at the time of the shooting. In this manner, the image display control section 13 causes the shot image to be displayed such that the orientation thereof is identical to the shooting attitude at the time of the shooting, whereby viewability can be improved. Although a width of the display section 55 is set as a long side in FIG. 6, the display section may be set such that a height thereof is the long side.

Figure 7:
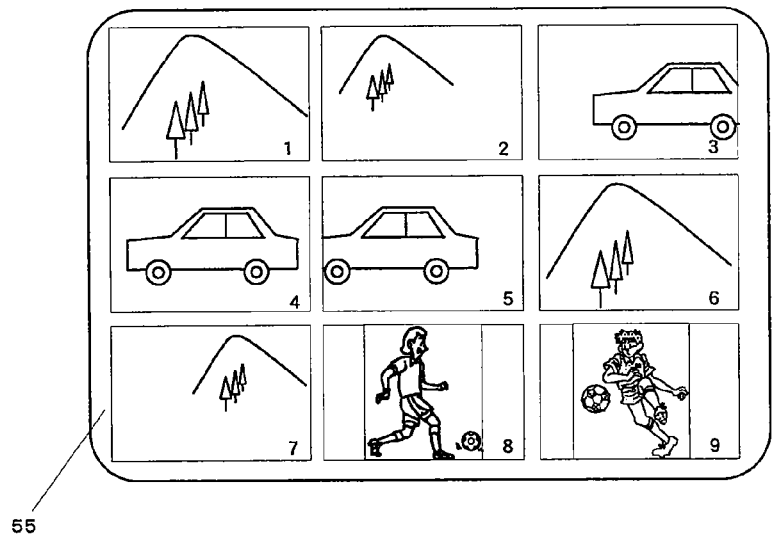
FIG. 7 is a diagram showing an exemplary display of a display section in the case where shot images are displayed in a thumbnail form in embodiment 1.

The above display control processing is also performed in a similar manner in the case where the shot images are displayed in the thumbnail form. FIG. 7 shows an exemplary display in the case where the shot images are displayed in the thumbnail form. As above described, in addition to the shot images, thumbnail images, which are obtained by processing the shot images through thinning-out processing or the like, are recorded in the image recording section 12. When the photographer operates the MENU setting operation section 39 or the like, the image display control section 13 causes a plurality of thumbnail images to be displayed on the display section 55 in order of a shooting date and time thereof. As shown in FIG. 7, the image display control section 13 causes total nine thumbnail images, which are arranged in 3 rows×3 columns, to be displayed on the display section 55. In FIG. 7, seven thumbnail images, number 1 to number 7 are horizontal thumbnail images, and two thumbnail images, number 8 and number 9 are vertical thumbnail images. In this manner, the vertical and horizontal thumbnail images are displayed on the display section 55 in a mixed manner.

Further, in the case of the thumbnail display as well, the image display control section 13 performs the display control processing similar to that shown in FIG. 6. In accordance with the attitude determination signal 60(0), the image display control section 13 causes the thumbnail images to be displayed in the same attitudes as shooting attitudes thereof at the time of shootings (number 1 to number 7 in FIG. 7). On the other hand, in the case where the attitude determination signal (1) is added to each of images, the image display control section 13 causes the thumbnail images to be rotated about the optical axis by 90° from the horizontal shooting attitude, and then displayed. That is, the image shots in the vertical shooting attitude are each restored such that the orientation thereof is identical to the shooting attitude at the time of the shooting and then displayed on the display section 55 (number 8 and number 9 in FIG. 7). Accordingly, the digital camera 1 according to the present embodiment is capable of realizing the easily viewable thumbnail display. The photographer can select one image from the thumbnail images, which are displayed on the display section 55, by operating the cross operation key 38. The selected thumbnail image is enlarged and displayed on the display section 55 as shown in FIG. 6.

The digital camera 1 according to the present embodiment is capable of displaying either the vertical thumbnail image or the horizontal thumbnail image in preference to the other. That is, in the digital camera according to the present embodiment, in the case of displaying the vertical and horizontal thumbnail images in the mixed manner, either the vertical thumbnail images or the horizontal thumbnail images are changed to a larger display size in preference to the other, and each of the thumbnail images is displayed by changing a location thereof. For example, in the case of displaying the vertical thumbnail images preferentially, each of the vertical thumbnail images is displayed in a larger size than the horizontal thumbnail images.

Figure 8:
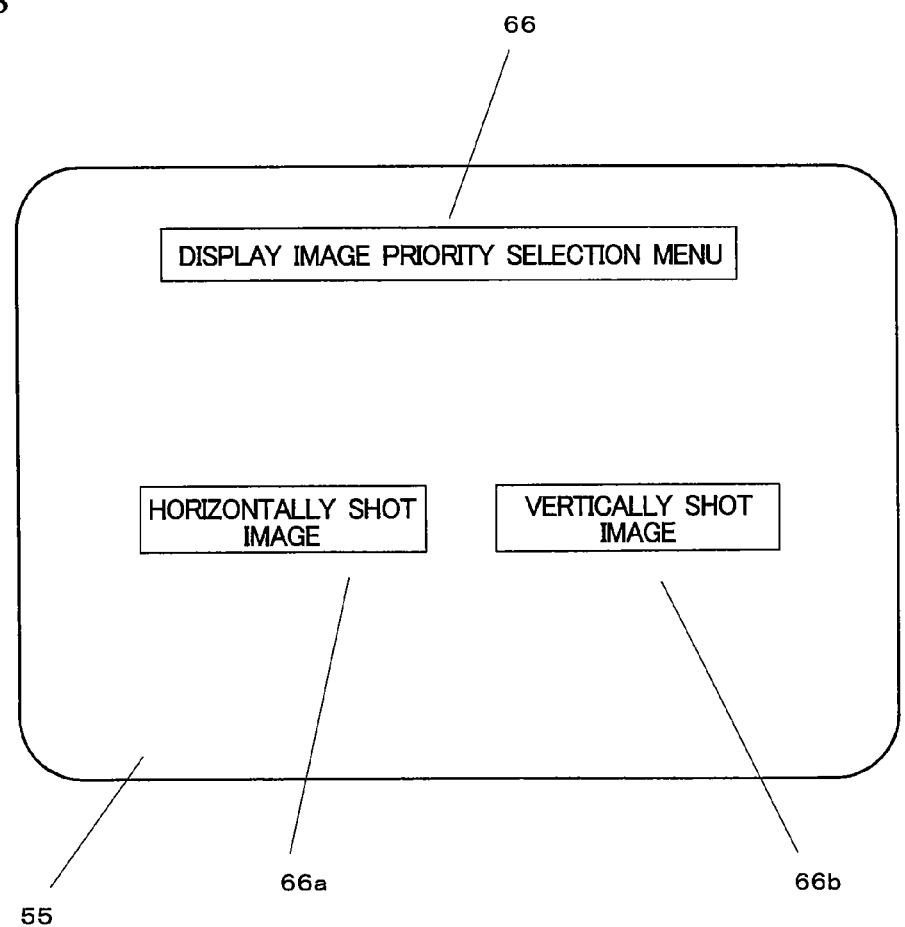
FIG. 8 is a diagram showing an exemplary display image priority selection menu displayed on the display section according to embodiment 1.

FIG. 8 is an exemplary display image priority selection menu 66 displayed on the display section 55. The display image priority selection menu 66 is displayed when the photographer turns the shooting/reproduction switching operation section 37 to the reproduction mode, and then presses the MENU setting operation section 39. The display image priority selection menu 66 is composed of a horizontally shot image selection button 66a and a vertically shot image selection button 66b. The photographer can select either of the selection buttons.

Figure 9A:
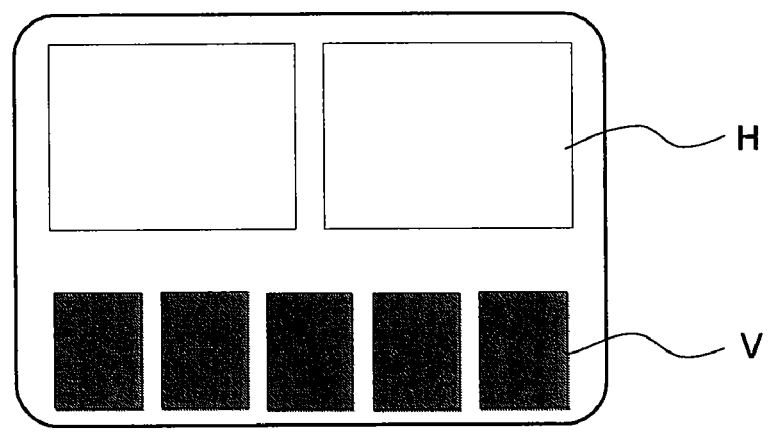
FIG. 9A is a diagram showing an exemplary display layout according to embodiment 1 in the case where preference is given to horizontal thumbnail images.

When the photographer has selected the horizontally shot image selection button 66a, the image display control section 13 causes the horizontal thumbnail images to be displayed on the display section 55 in a larger display size than the vertical thumbnail images. FIG. 9A is an exemplary layout in which the horizontal thumbnail images are displayed preferentially. As shown in FIG. 9A, two horizontal thumbnail images H and five vertical thumbnail images V are displayed on the display section 55. When the horizontally shot image selection button 66a has been selected, the image display control section 13 causes each of the thumbnail images to be displayed in a predetermined size at a predetermined location in accordance with the layout shown in FIG. 9A. Accordingly, the horizontal thumbnail images H are displayed in the larger size than the vertical thumbnail images V, and thus viewability of the horizontal thumbnail images H can be improved.

Figure 9B:
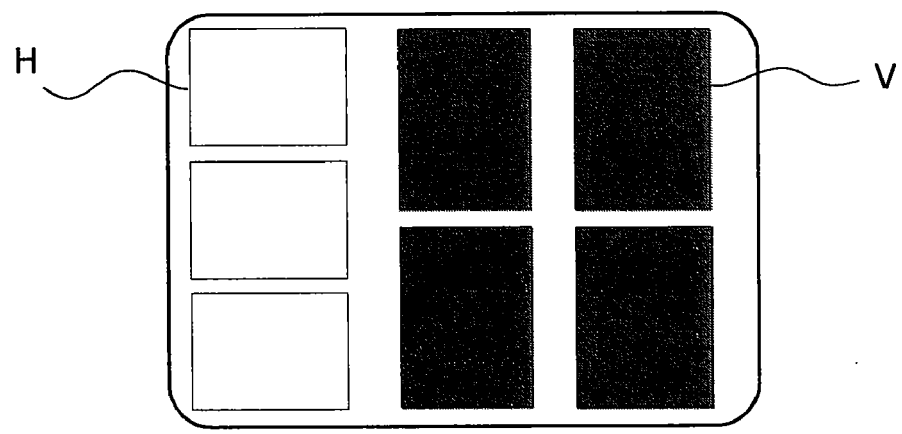
FIG. 9B is a diagram showing an exemplary display layout according to embodiment 1 in the case where the preference is given to vertical thumbnail images.

On the other hand, when the vertically shot image selection button 66b has been selected by the photographer, the image display control section 13 causes the vertical thumbnail images to be displayed in a larger display size than the horizontal thumbnail images. FIG. 9B is an exemplary layout in which the vertical thumbnail images are displayed preferentially. As shown in FIG. 9B, three horizontal thumbnail images H and four vertical thumbnail images V are displayed on the display section 55. When the vertically shot image selection button 66b has been selected, the image display control section 13 causes each of the thumbnail images to be displayed in a predetermined display size at a predetermined location in accordance with the layout shown in FIG. 9B. Accordingly, the vertical thumbnail images V are displayed in the larger display size than the horizontal thumbnail images H, and thus viewability of the vertical thumbnail images V can be improved.

Figure 10A:
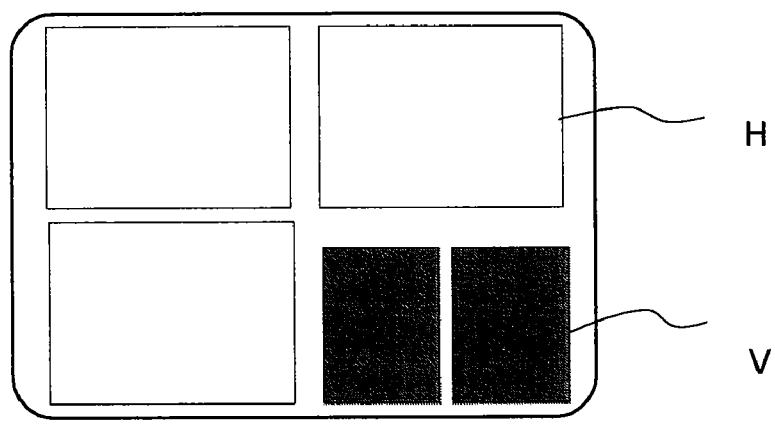
FIG. 10A is another exemplary display layout according to embodiment 1.
Figure 10B:
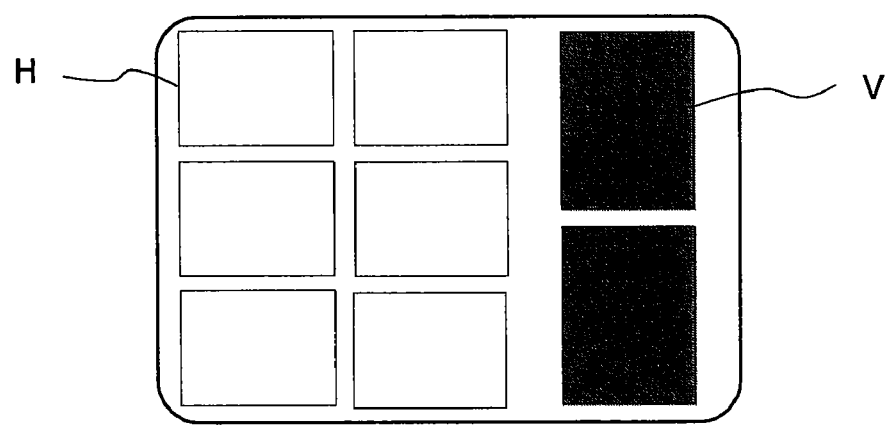
FIG. 10B is another exemplary display layout according to embodiment 1.

The layouts shown in FIGS. 9A and 9B are merely examples, and various layouts may be considered other than these. In other words, various layouts may be applicable as long as the thumbnail images having been shot in one shooting attitude, to which preference is given, are displayed in a larger display size than the thumbnail images shot in the other shooting attitude. Therefore, the image display control section 13 may cause each of the thumbnail images to be displayed in a layout shown in FIG. 10A, in which the horizontal thumbnail images H are given the preference, or may causes each of the thumbnail images to be displayed in a layout shown in FIG. 10B, in which the vertical thumbnail images V are given the preference.

As above described, the digital camera according to the present embodiment restores the orientation of the thumbnail images so as to be identical to the shooting attitude at the time of the shooting, and causes the restored thumbnail images to be displayed on the display section. Further, in the digital camera according to the present embodiment, either the vertical thumbnail images or the horizontal thumbnail images are displayed in preference to the other. Accordingly, the digital camera according to the present embodiment causes each of the thumbnail images having been shot in one shooting attitude, to which the preference is given, to be displayed in a larger size than the thumbnail images shot in the other shooting attitude, and consequently the easily viewable thumbnail display can be realized even in the case where thumbnail images in various shooting attitudes are displayed in the mixed manner.

Figure 11A:
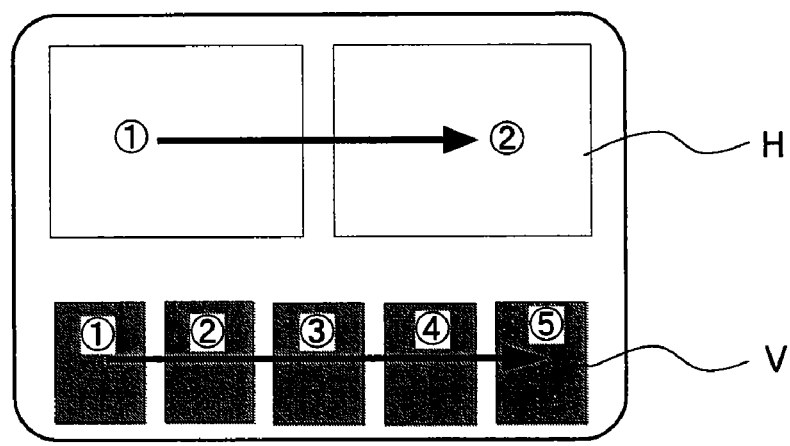
FIG. 11A is a diagram illustrating a display order of images according to embodiment 1.
Figure 11B:
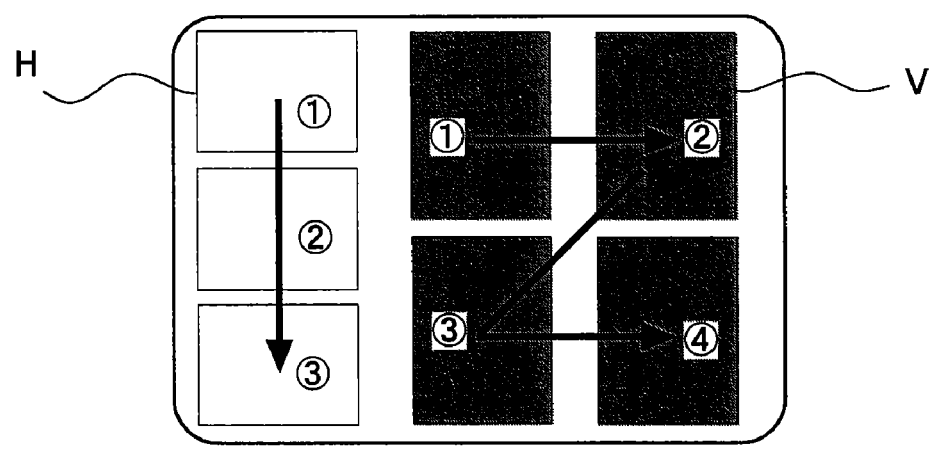
FIG. 11B is a diagram illustrating the display order of the images according to embodiment 1.

As to a display order of the thumbnail images, the thumbnail images may be displayed on the display section 55 from the left to the right in order of the shooting date and time. FIGS. 11A and 11B are each a diagram showing the display order of the thumbnail images in the layout shown in FIG. 8. As shown in each of FIGS. 11A and 11B, the horizontal thumbnails and the vertical thumbnail images are displayed in chronological order of the shooting date and time as indicated by arrows shown in the diagram. The display orders shown in FIGS. 11A and 11B are merely examples, and any order may be applicable other than these. For example, the thumbnail images may be displayed randomly regardless of the shooting date and time.

The digital camera according to the present embodiment may further include a display layout storage section for storing therein a plurality of layouts. In this case, the image display control section 13 extracts a predetermined layout from the display layout storage section in accordance with a result of selection from the display image priority selection menu 66, and causes each of the thumbnail images to be displayed on the display section 55 in accordance with the extracted layout. The display layout storage section may store therein one layout for preferentially displaying the vertical thumbnail images and one layout for preferentially displaying the horizontal thumbnail images, respectively, or may stores therein a plurality of layouts for preferentially displaying the vertical thumbnail images and a plurality of layouts for preferentially displaying the horizontal thumbnail images.

The digital camera according to the present embodiment causes the thumbnail image to be displayed in accordance with the layout, however, this is not the only case. Information indicative of a display size and a location is added to the image file having the image signal stored therein, and thumbnail image may be displayed in accordance with the added information.

Embodiment 2

Figure 12:
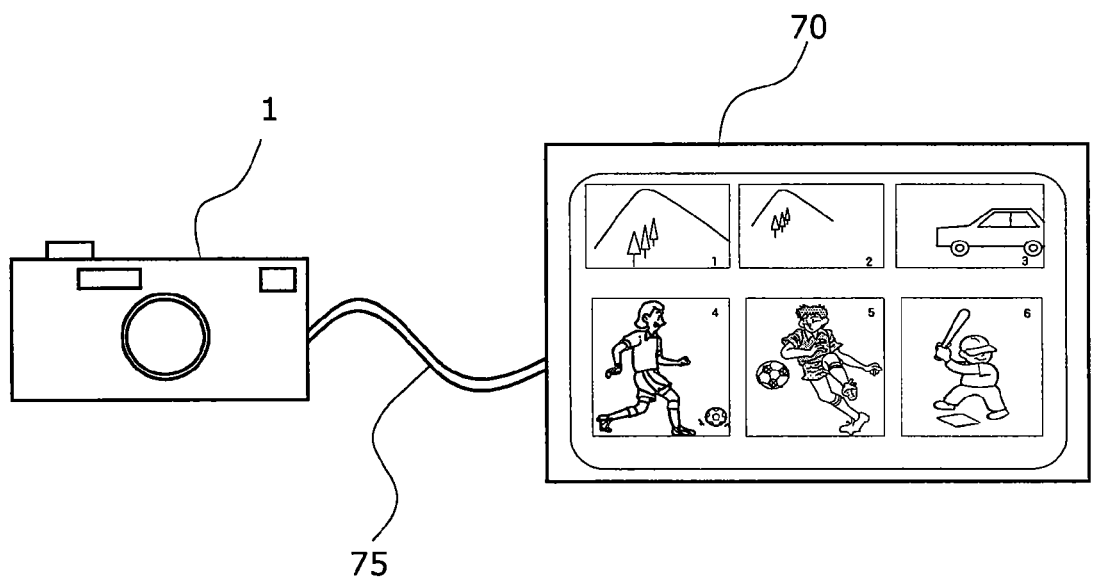
FIG. 12 is a diagram showing a display device and a digital camera according to embodiment 2.

FIG. 12 is a diagram showing a display device and a digital camera according to embodiment 2. A display device 70 according to the present embodiment is connected to a digital camera 1 via a cable 75. The digital camera 1 has a configuration substantially similar to that according to embodiment 1, but is different in that a shot image recorded in an image recording section in the digital camera 1 is displayed on an externally connected display device 70. Hereinafter those points which are different from embodiment 1 will be mainly described.

The display device 70 is, for example, a television monitor on which the shot image and thumbnail images are each displayed such that an orientation thereof is identical to a shooting attitude thereof at the time of shooting in accordance with a control signal outputted from the digital camera 1. The cable 75 is, for example, a USB (Universal Serial Bus), and connects the display device 70 and the digital camera 1. The display device 70 is controlled by the image display control section 13 via the cable 75. That is, the image display control section 13 causes each of the shot image and the thumbnail images to be displayed on the display device 70 such that the orientation thereof is identical to the shooting attitude at the time of the shooting. Further, in the case of performing a thumbnail display, the image display control section 13 causes either a thumbnail image shot in the vertical shooting attitude or a thumbnail image shot in the horizontal shooting attitude to be displayed preferentially. Since functions of the image display control section 13 and effects obtained therefrom are the same as those according to embodiment 1, description thereof will be omitted.

In this manner, the display device according to the present embodiment is capable of displaying each of the thumbnail images in accordance with the control signal outputted from the digital camera such that the orientation thereof is identical to the shooting attitude at the time of the shooting. Further, the display device causes either the thumbnail image shot in the vertical shooting attitude or the thumbnail image shot in the horizontal shooting attitude to be displayed preferentially in accordance with the control signal outputted from the digital camera. Therefore, the thumbnail image having been shot in the shooting attitude, to which the preference is given, can be displayed in a larger size than the thumbnail image shot in the other shooting attitude, and thus an easily viewable thumbnail display can be realized even when the thumbnail images shot in various shooting attitudes are displayed in a mixed manner.

Particularly by using the display device according to the present embodiment, an image can be displayed on a display screen which is larger than a display section provided to the digital camera. Accordingly, a still easily viewable thumbnail display can be realized. The display device according to the present embodiment is particularly effective for a case where an image shot by a digital camera without having a display section is displayed.

The display device according to the present embodiment is exemplified by the television monitor, but is not limited thereto. For example, the digital camera may be connected, via a cable, to a personal computer having a monitor connected thereto.

The cable 75 included in the present embodiment is exemplified by the USB cable, but is not limited thereto. For example, connection may be made by using an IEEE1394 serial bus cable or made wirelessly by using a wireless LAN. Further, in the case where another technology replacing the above-described technologies becomes available due to improvement in communication technology or emergence of another technology derived therefrom, obviously such technology may be used for connection.

Embodiment 3

Figure 13:
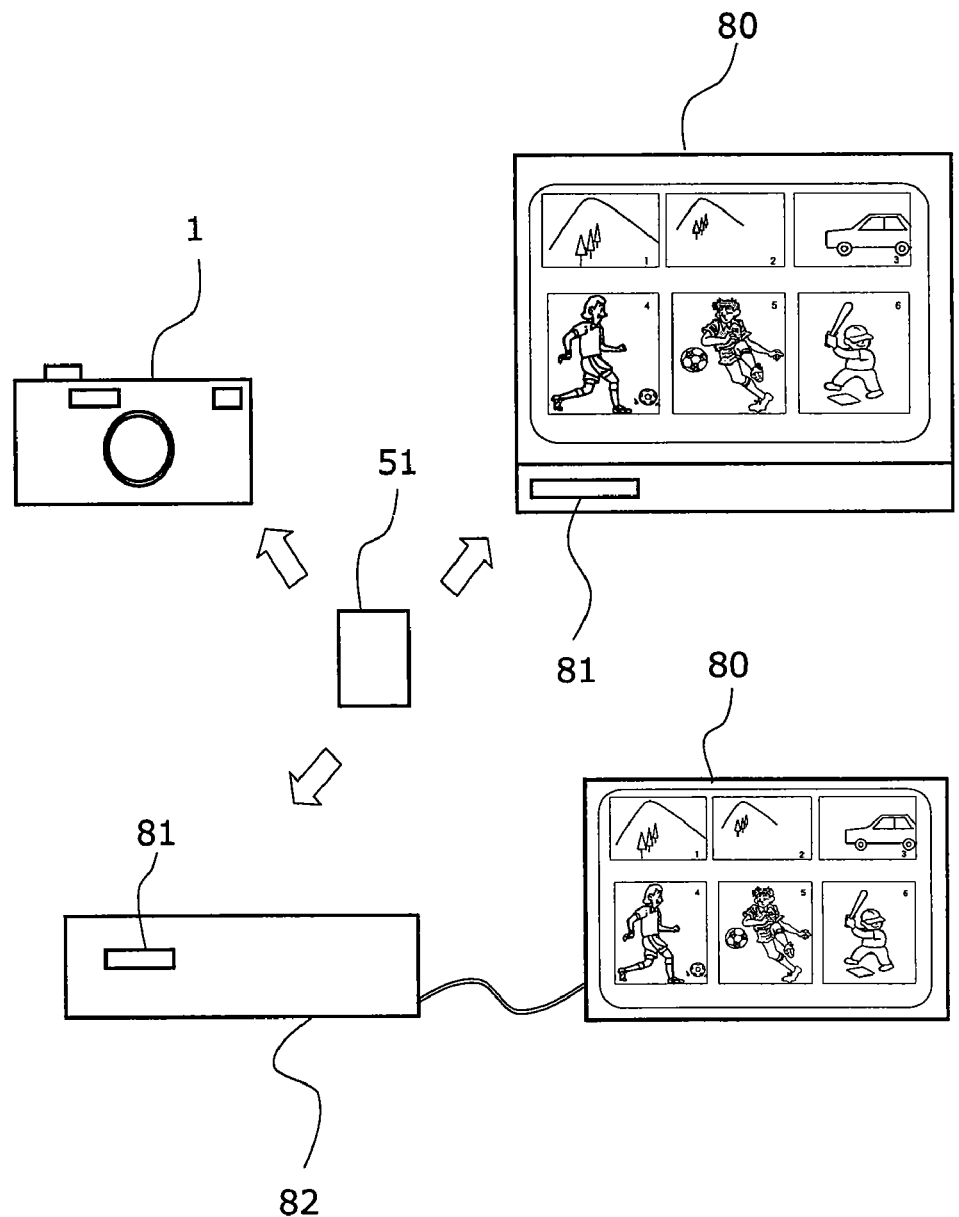
FIG. 13 is a diagram showing a display control device, a digital camera and a display device according to embodiment 3.
Figure 15:
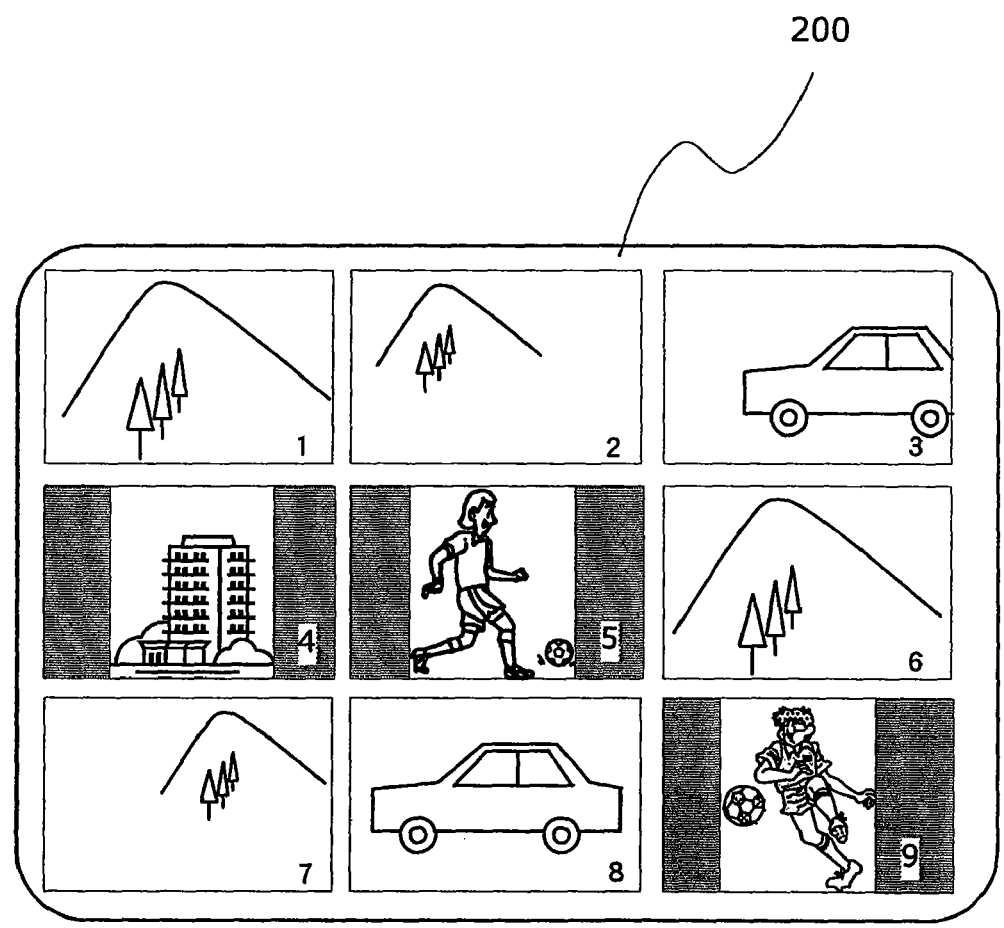
FIG. 15 is a diagram showing an exemplary list of shot images displayed by a conventional imaging device.

FIG. 13 is a diagram showing a display control device, a digital camera and a display device according to embodiment 3. In FIG. 13, a digital camera 1 and a display device 80 have the same configurations as those according to embodiments 1 and 2, but are different in that they are capable of reading an image recorded in a removable memory 51 together with attitude information. Further, a display control device 82 according to the present embodiment has the same function as the image display control section 13 according to embodiment 1. Hereinafter, those points which are different from embodiments 1 and 2 will be mainly described.

An image shot by the digital camera 1 is recorded in the removable memory 51 together with the attitude information. The removable memory is, for example, a memory card. The display device 80 has substantially the same configuration as the display device 70 according to embodiment 2, and further includes a removable memory insertion section 81. The display device 80 is capable of reading thumbnail images recorded in the removable memory 51 together with the attitude information.

The display control device 82 has the same function as the image display control section 13 according to embodiment 1, and controls a display of a shot image on the display device 80. The display control device 82 is typified by a hard disk recorder and a personal computer, for example. The display control device 82 outputs, to the display device 80, a control signal for displaying each of the shot image and the thumbnail images such that the orientation thereof is identical to a shooting attitude thereof at the time of shooting in accordance with the attitude information. Here, the control signal outputted from the display control device 82 includes a signal for causing either the thumbnail image shot in a vertical shooting attitude or the thumbnail image shot in a horizontal shooting attitude to be displayed preferentially. The display device 80 displays each of the shot image and the thumbnail images in accordance with the control signal outputted from the display control device 82.

As above described, the display control device according to the present embodiment causes the thumbnail images to be displayed on the display device such that the orientations thereof are identical to the shooting attitudes at the time of the shootings in accordance with the attitude information. Further, the display control device causes either the thumbnail image shot in the vertical shooting attitude or the thumbnail image shot in the horizontal shooting attitude to be displayed preferentially on the display device. Accordingly, the thumbnail images having been shot in the shooting attitude, to which the preference is given, can be displayed in a larger size than the thumbnail images shot in the other shooting attitude, and thus an easily viewable thumbnail display can be realized even when the thumbnail images shot in various shooting attitudes are displayed in a mixed manner.

Since the display control device according to the present embodiment is capable of realizing the easily viewable thumbnail display in accordance with the read shot image and the attitude information, the digital camera only needs to record the shot image and the attitude information and does not need to have a complicated configuration.

Respective component parts included in the display control device, the digital camera and the display device according to the present invention may be arbitrarily combined to one another. For example, the digital camera may include a display layout storage section, and a selected display layout may be stored in the removable memory together with the shot image. The combination of the respective component parts is not limited to these.

The display control device according to the present embodiment is exemplified by the hard disk recorder and the personal computer, but is not limited thereto. For example, the shot image may be displayed on a television monitor via a DVD recorder or the like which is capable of reading the removable memory.

The display device and the display control device according to the present embodiment have the removable memory insertion section, but are not limited thereto. For example, a configuration may be applicable in which a reading device such as a memory card reader which is capable of reading the removable memory, the display control device, and the display device are connected to one another.

In embodiments 1 to 3, a screen of the display section may be virtually divided into two or three so as to display the thumbnail images on the divided screens.

Embodiments 1 to 3 are each exemplified by a case where the digital camera includes one shutter operation section, but are not limited there to. For example, two shutter operation sections, i.e., the first shutter operation section used in the case of the horizontal shooting attitude and a second shutter operation section used in the case of the vertical shooting attitude may be provided. Accordingly, even if the digital camera does not have the attitude detection section, it is possible to easily understand in which of the shooting attitudes an image has been shot.

Embodiments 1 to 3 are each exemplified by a case where the shot image is the still image. However, a similar effect can be obtained even in the case of a moving image or a simplified moving image.

Embodiments 1 to 3 are each exemplified by a case where the horizontal shooting attitude is set to 0°, and the attitude of the digital camera when the digital camera is rotated about the optical axis by 90° from the horizontal shooting attitude is set as the vertical shooting attitude, but are not limited thereto. The vertical shooting attitude includes an attitude of the digital camera when the same is rotated about the optical axis by −90° from the horizontal shooting attitude. Further, when the digital camera is rotated about the optical axis by −90° from the horizontal shooting attitude, the attitude detection section may add an attitude determination signal (2), and accordingly may detect three types of attitudes, i.e., one type of the horizontal shooting attitude and two types of the vertical shooting attitudes.

Embodiments 1 to 3 are each exemplified by a case where the attitude detection section adds the attitude determination signal (0) or (1), but are not limited there to. For example, a signal may be added to only an image shot in the vertical shooting attitude. Further, the attitude determination signal is stored in the header or the footer of the image file, but is not necessarily stored therein. The attitude determination signal may be stored in a file different from that for the image signal, and the image file having the image signal recorded therein and the attitude determination file having the attitude determination signal recorded therein may be interrelated to each other.

Embodiments 1 to 3 are each exemplified by a care where an aspect ratio of the display section or the display device is set such that the width thereof is a long side, but are not limited thereto. A similar effect may be attained even if a height of the display section or the display device is set as the long side.

Embodiments 1 to 3 are each exemplified by a case where the digital camera includes the imaging optical system, but are not limited thereto. The present invention may be applicable to a system such as a single-lens reflex camera system in which a lens barrel supporting the imaging optical system and a camera body including an imaging device are configured separately.

Embodiments 2 and 3 are each exemplified by a configuration in which the shot image is displayed on the display device externally connected to the digital camera, but are not limited thereto. For example, a similar effect as the present invention can be attained even in the case where a printing device is externally connected to the digital camera.

Embodiments 2 and 3 are each exemplified by a case where the thumbnail images are displayed on the display device. In the case of displaying a single shot image as well, the shot image can be displayed by restoring an orientation thereof.

INDUSTRIAL APPLICABILITY

The imaging device, the display device, and the display control device according to the present invention are suitable to a digital still camera, a digital video camera, a camera-equipped cellular phone, a PDA, a DVD recorder, a hard disk recorder and the like which are required to have a method for conveniently displaying a shot image.

The invention claimed is:

1. An imaging device for outputting an optical image of an object as an electrical image signal, the imaging device comprising:
    an imaging optical system for forming the optical image of the object;
    an imaging sensor for receiving the optical image of the object formed by the imaging optical system, for converting the optical image into the electrical image signal, and for outputting the electrical image signal;
    an attitude detection section for detecting an attitude of the imaging device at the time of shooting;
    an image recording section for interrelating and recording the outputted image signal and attitude information indicative of the detected attitude;
    a display section for displaying a reduced image based on the recorded image signal;
    a reception section for receiving a selection of either a vertical image or a horizontal image from a user; and
    an image display control section for restoring an orientation of the reduced image so as to correspond to the attitude of the imaging device at the time of the shooting in accordance with the attitude information and for causing the display section to display the restored reduced image, wherein
    when the vertical image and the horizontal image are arranged on the display section, the image display control section changes, in accordance with a result of the selection, locations of the vertical image and the horizontal image on the display section, and changes a display size of either the vertical image or the horizontal image, which corresponds to the selection, to be larger than the other, and
    the image display control section changes the number of the vertical images and the horizontal images to be displayed on the display section in accordance with the result of the selection.

2. The imaging device according to claim 1, further comprising
    a layout storage section for storing a layout which defines a location and a display size of each of the vertical images and the horizontal images to be displayed on the display section, wherein
    the layout storage section stores a vertical image preferential display layout for displaying each of the vertical images in a larger size than the horizontal images and a horizontal image preferential display layout for displaying each of the horizontal images in a larger size than the vertical images, and the image display control section causes the display section to display the vertical images and the horizontal images in accordance with the result of the selection and also in accordance with either the vertical image preferential display layout or the horizontal image preferential display layout.

3. An imaging device which outputs an optical image of an object as an electrical image signal and which is connectable to a display device, the imaging device comprising:
- an imaging optical system for forming the optical image of the object;
- an imaging sensor for receiving the optical image of the object formed by the imaging optical system, for converting the optical image into the electrical image signal, and for outputting the electrical image signal;
- an attitude detection section for detecting an attitude of the imaging device at the time of shooting;
- an image recording section for interrelating and recording the outputted image signal and attitude information indicative of the detected attitude;
- a reception section for receiving a selection of either a vertical image or a horizontal image from a user; and
- a display control signal output section for outputting a signal for restoring an orientation of the reduced image so as to correspond to the attitude of the imaging device at the time of the shooting in accordance with the attitude information and for causing the display device to display the restored reduced image, wherein
- when the vertical image and the horizontal image are arranged on the display device, the display control signal includes a signal for changing, in accordance with a result of the selection, locations of the vertical image and the horizontal image on the display device, and for changing a display size of either the vertical image or the horizontal image, which corresponds to the selection, to be larger than the other, and
- the image display control section changes the number of the vertical images and the horizontal images to be displayed on the display section in accordance with the result of the selection.

4. A display control device connectable to a display device, comprising:
- a reading section for reading an image signal and attitude information corresponding to the image signal, the image signal and the attitude information being recorded in a recording section;
- a reception section for receiving a selection of either a vertical image or a horizontal image from a user; and
- a display control signal output section for outputting a signal for restoring an orientation of the reduced image so as to correspond to the attitude of the imaging device at the time of the shooting in accordance with the attitude information and for causing the display device to display the restored reduced image, wherein
- when the vertical image and the horizontal image are arranged on the display device, the display control signal includes a signal for changing, in accordance with a result of the selection, locations of the vertical image and the horizontal image on the display device, and for changing a display size of either the vertical image or the horizontal image, which corresponds to the selection, to be larger than the other, and
- the display control signal includes a signal for changing the number of the vertical images and the horizontal images to be displayed on the display device in accordance with the result of the selection.

5. The display control device according to claim 4, further comprising
- a layout storage section for storing a layout which defines a location and a display size of each of the vertical images and the horizontal images to be displayed on the display device, wherein
- the layout storage section stores a vertical image preferential display layout for displaying each of the vertical images in a larger size than the horizontal images and a horizontal image preferential display layout for displaying each of the horizontal images in a larger size than the vertical images, and
- the display control signal includes a signal for causing the display device to display the vertical images and the horizontal images in accordance with the result of the selection and in accordance with either the vertical image preferential display layout or the horizontal image preferential display layout.

6. An image display system including an imaging device for outputting an optical image of an object as an electrical image signal, and a display device for displaying a shot image,
the imaging device comprising:
- an imaging optical system for forming the optical image of the object;
- an imaging sensor for receiving the optical image formed by the imaging optical system, for converting the optical image into the electrical image signal, and for outputting the electrical image signal;
- an attitude detection section for detecting an attitude of the imaging device at the time of shooting;
- an image recording section for interrelating and recording the outputted image signal and attitude information indicative of the detected attitude;
- a reception section for receiving a selection of either a vertical image or a horizontal image from a user; and
- a display control signal output section for outputting a signal for restoring an orientation of the reduced image so as to correspond to the attitude of the imaging device at the time of the shooting in accordance with the attitude information and for causing the display device to display the restored reduced image, the display device comprising:
- a reception section for receiving the recorded image signal and the outputted display control signal; and
- a display section for displaying the reduced image in accordance with the display control signal, the reduced image being based on the image signal, wherein
- when the vertical image and the horizontal image are arranged on the display section, the display control signal includes a signal for changing, in accordance with a result of the selection, locations of the vertical image and the horizontal image on the display section, and for changing a display size of either the vertical image or the horizontal image, which corresponds to the selected attitude information, to be larger than the other, and
- the display control signal includes a signal for changing the number of the vertical images and the horizontal images to be displayed on the display device in accordance with the result of the selection.

7. An imaging system including a lens barrel and an imaging device which is detachably fixed to the lens barrel, wherein the lens barrel comprises:
an imaging optical system for forming an optical image of an object, the imaging device comprises:
an imaging sensor for receiving the optical image of the object formed by the imaging optical system connected thereto, for converting the optical image into the electrical image signal, and for outputting the electrical image signal;
an attitude detection section for detecting an attitude of the imaging device at the time of shooting;
an image recording section for interrelating and recording the outputted image signal and attitude information indicative of the detected attitude;
a display section for displaying a reduced image based on the recorded image signal;
a reception section for receiving a selection of either a vertical image or a horizontal image from a user; and
an image display control section for restoring an orientation of the reduced image so as to correspond to the attitude of the imaging device at the time of the shooting in accordance with the attitude information and for causing the display section to display the restored reduced image, and when the vertical image and the horizontal image are arranged on the display section, the image display control section changes, in accordance with a result of the selection, locations of the vertical image and the horizontal image on the display section, and changes a display size of either the vertical image or the horizontal image, which corresponds to the selected attitude information, to be larger than the other, and the image display control section changes the number of the vertical images and the horizontal images to be displayed on the display section in accordance with the result of the selection.

* * * * *